United States Patent
Frick

(10) Patent No.: US 6,901,101 B2
(45) Date of Patent: May 31, 2005

(54) OPTICAL SENSOR FOR MEASURING PHYSICAL AND MATERIAL PROPERTIES

(75) Inventor: Roger L. Frick, Hackensack, MN (US)

(73) Assignee: Rosemount Inc., Eden Prairie, MN (US)

(*) Notice: Subject to any disclaimer, the term of this patent is extended or adjusted under 35 U.S.C. 154(b) by 370 days.

(21) Appl. No.: 09/996,143

(22) Filed: Nov. 28, 2001

(65) Prior Publication Data

US 2005/0063444 A1 Mar. 24, 2005

Related U.S. Application Data

(60) Provisional application No. 60/253,703, filed on Nov. 28, 2000, provisional application No. 60/253,704, filed on Nov. 28, 2000, and provisional application No. 60/253,705, filed on Nov. 28, 2000.

(51) Int. Cl.[7] ............................................... H01S 3/08
(52) U.S. Cl. .................... 372/92; 372/109; 250/227.14; 250/227.16; 250/227.18; 250/227.19
(58) Field of Search ........................... 372/92, 109, 94; 250/227.14, 227.16, 227.18, 227.19

(56) References Cited

U.S. PATENT DOCUMENTS

| | | | |
|---|---|---|---|
| 4,452,533 A | | 6/1984 | Miles et al. |
| 4,758,087 A | * | 7/1988 | Hicks, Jr. .................... 356/480 |
| 4,955,028 A | | 9/1990 | Alferness et al. |
| 5,097,476 A | | 3/1992 | Thiessen |
| 5,182,779 A | | 1/1993 | D' Agostino et al. |
| 5,187,546 A | | 2/1993 | Johnston |
| 5,319,435 A | | 6/1994 | Melle et al. |
| 5,331,658 A | | 7/1994 | Shieh et al. |
| 5,361,313 A | | 11/1994 | O' Keefe |
| 5,400,140 A | | 3/1995 | Johnston |

(Continued)

FOREIGN PATENT DOCUMENTS

| | | | | |
|---|---|---|---|---|
| EP | 0 348 039 A2 | | 12/1989 | |
| EP | 0 571 107 A1 | | 11/1993 | |
| EP | 0571107 A1 | * | 11/1993 | ............. G01L/1/24 |
| JP | 07063855 | | 3/1995 | |
| WO | WO 95/13638 | | 5/1995 | |

OTHER PUBLICATIONS

Weisbuch et al.; Advances in Photonic Crystals, phys. stat. sol. (b) 221, 93 (2000).*

Arentoft, et al. Picco, D1 Report, pp. 1–26.

Berkoff, et al. "Experimental Demonstration of a Fiber Bragg Grating Accelerometer," *Photonics Tech. Letters* 8(12):1677–1679 (1996).

(Continued)

*Primary Examiner*—Wilson Lee
*Assistant Examiner*—Leith Al-Nazer
(74) *Attorney, Agent, or Firm*—Marshall, Gerstein & Borun LLP

(57) ABSTRACT

An optical medium having a cavity that defines a variable gap is provided. The optical medium is used in an optical sensor, laser, and variable frequency resonator, by way of example. The cavity is physically altered in response to changes in a measurable parameter like pressure, temperature, force, flow rate, and material composition. The optical medium is characterized in some embodiments by having a cavity disposed near or within a high Q optical resonator. The optical resonator can be formed by various structures of which Bragg reflector cavities, ring resonators, microdiscs, and microspheres are examples. The optical resonator is preferably coupled to a laser source. The altering of the cavity affects the resonance condition within the optical resonator and thereby the laser signal of the system. If the laser source is a mode locked laser, the repetition rate of the pulse train changes in response to changes in the measurable parameter. If the laser source is a CW source the frequency of the laser signal is dependent upon a measurable parameter.

59 Claims, 13 Drawing Sheets

U.S. PATENT DOCUMENTS

| | | | | |
|---|---|---|---|---|
| 5,493,113 A | * | 2/1996 | Dunphy et al. | 250/227.19 |
| 5,509,022 A | | 4/1996 | Lowery et al. | |
| 5,513,913 A | * | 5/1996 | Ball et al. | 374/120 |
| 5,534,992 A | | 7/1996 | Takeshima et al. | |
| 5,564,832 A | | 10/1996 | Ball et al. | |
| 5,594,543 A | | 1/1997 | de Groot et al. | |
| 5,637,865 A | | 6/1997 | Bullat et al. | |
| 5,642,375 A | | 6/1997 | King et al. | |
| 5,663,792 A | * | 9/1997 | Killpatrick et al. | 356/473 |
| 5,808,743 A | | 9/1998 | Stephens et al. | |
| 5,822,355 A | | 10/1998 | Ahn et al. | |
| 5,825,799 A | * | 10/1998 | Ho et al. | 372/92 |
| 5,974,060 A | | 10/1999 | Byren et al. | |
| 6,034,770 A | | 3/2000 | Kim et al. | |
| 6,473,218 B1 | * | 10/2002 | Maleki et al. | 359/245 |
| 2001/0012149 A1 | * | 8/2001 | Lin et al. | 359/344 |
| 2002/0154860 A1 | | 10/2002 | Fernald et al. | |

OTHER PUBLICATIONS

Big Payoffs in a Flash, *Scientific American* Sep. 2000 pp. 73–79.

Cai, et al. "Fiber–Optic Add–Drop Device Based on a Silica Microsphere–Whispering Gallery Mode System," *Photonics Technology Letters* 11(6):686–687 (1999).

Cai, et al. "Highly efficient optical power transfer to whispering–gallery modes by use of a symmetrical dual–coupling configuration," *Optics Letters* 25(4):260–262 (2000).

Dandliker, et al. "Electronically scanned white–light interferometry: a novel noise–resistant signal processing," *Optics Letters* 17(9):679–681 (1992).

De Brabander, et al. "Integrated Optical Ring Resonator With Micromechanical Diaphragm for Pressure Sensing," *Photonics Technology Letters* 6(5):671–673 (1994).

"Fiber Optic Sensors by Blue Road Research," *MEMS—Micromachines in Silicon—MEMS and MST from Standard MEMS*.

Fuhr, "Measuring with Light; Part 1" *Sensors* (2000).

Fuhr, "Measuring with Light; Part 2" *Sensors* (2000).

Fuhr, "Measuring with Light; Part 3" *Sensors* (2000).

"High–quality ring resonators," Zurich Research Laboratory.

Jones, et al. "Near–diffraction–limited high power (~1W) single longitudinal mode CW diode laser tunable from 960 to 980nm," *Electronics Letters* 31(19):1668–1669 (1995).

Jones, et al. "Stabilization of the frequency, phase, and repetition rate of an ultra–short pulse train to a Fabry–Perot reference cavity," *Optics Communications* 175:409–418 (2000).

Katagiri, et al. "Dynamic microforce measurement by distortion detection with a coupled–cavity laser displacement sensor stabilized in a mechanical negative–feedback loop," *Applied Optics* 37(31):7193–7199 (1998).

Katagiri, et al. "Passively Mode–Locked Micromechanically–Tunable Semiconductor Lasers," *IEICE Trans. Electron.* E81(2):151–159 (1998).

Katagiri, "Small Displacement Sensor Measures Tiny Forces," *Sensor Technology* 16(6):7.

Kersey, et al. "Fiber Grating Sensors," *Journal of Lightwave Technology* 15(8):1442–1463 (1997).

Koo, et al. "Bragg Grating–Based Laser Sensors Systems with Interferometric Interrogation and Wavelength Division Multiplexing," *Journal of Lightwave Technology* 13(7):1243–1249 (1995).

Kurita, et al. "Ultrafast All–Optical Signal Processing with Mode–Locked Semiconductor Lasers," *IEICE Trans Electron* E81–C(2):129–139 (1998).

"Light–sensing technologies hurdle barriers," *NASA News* p. 28 (1997).

Meggitt, et al. "An all fibre white light interferometric strain measurement system," *Sensors and Actuators* 79:1–7 (2000).

Meggitt, et al. "Fiber optic white–light interferometric sensors," *Optical Fiber Sensor Tech.* pp. 269–312 (1995).

Notcutt, et al. "Allan Deviation Measurements of a Cryogenic All–Sapphire Fabry–Perot Reference Cavity," *1996 Conference on Precision Electromagnetic Measurements Digest*, pp. 193–194 (1996).

Rao, et al. "Recent progress in fibre optic low–coherence interferometry," *Meas. Sci. Technol.* 7:981–999 (1996).

"Resonant Structures and Devices Research," MIT Microphotonics Center.

Rogister, et al. "Experimental demonstration of suppression of low–frequency fluctuations and stabilization of an external–cavity laser diode," *Optics Letters* 25(11):808–810 (2000).

Schultz, et al. "Advanced fiber grating strain sensor systems for bridges, structures, and highways,".

Schulz, et al. "Health monitoring of an adhesive joint using a multi–axis fiber grating strain sensor system".

Sutter, et al. The Shortest KLM Ti:Sapphire Laser Pulse Started by a Semiconductor Saturable Absorber Mirror (SESAM), *IEICE Trans. Electron.* E81–C(2):123–124 (1998).

"Surface Gratings for Optical Coupling with Microspheres" NASA's Jet Propulsion Laboratory.

"Systems & Sensors," Bell College of Technology.

Tabib–Azar, et al. "Fiber–optics MEMS pressure sensors based on evanescent field interaction," *SPIE* 3276:135–146.

Tabib–Azar, et al. "MOEM Pressure and Other Physical Sensors Using Photon Tunneling and Optical Evanescent Fields with Exponential Sensitivities and Excellent Stabilities," *Conf. on Microelectronic Structures and MEMS for Optical Processing* 3513:210–222 (1998).

Talvitie, et al. "Improved frequency stability of an external cavity diode laser by eliminating temperature and pressure effects," *Applied Optics* 35(21):4166–4168 (1996).

Technology Transfer, OPLL sensor eases strain monitoring, NASA news, Jul. 2000, p. 30.

Udem, et al. "Accurate measurement of large optical frequency differences with a mode–locked laser," *Optics Letters* 24(13):881–883 (1999).

Vasil'ev, et al. "A Diode Laser with an External High–Q Microcavity" LEOS Summer Topical Meeting, pp. 31–32 (1997).

Vassilovski, et al. "Carrier Transport Effects in Active and Passive Modelocking of Monolithic Quantum–Well Lasers at Millimeter–Wave Frequencies," *Photonics Tech. Letters* 8(12):1603–1605 (1996).

Weisbuch, et al., "Advances in Photonic Crystals," *Phys. Stat. Sol.* 221:93–99 (2000).

Weiss, "Spectrum deftly takes visible light's pulse," *Science News* 157(23):358–359 (2000).

Xinqui, et al. "A Narrow Line Width Tunable Diode Laser System," *Chinese Journal of Lasers*, B7(3):217–221 (1998).

* cited by examiner

OPTICAL SENSOR FOR MEASURING PHYSICAL AND MATERIAL PROPERTIES

RELATED APPLICATION

This application claims the benefit of U.S. Provisional Application No. 60/253,703, filed Nov. 28, 2000; U.S. Provisional Application No. 60/253,704, filed Nov. 28, 2000; and U.S. Provisional Application No. 60/253,705, filed Nov. 28, 2000, the specifications of which are all incorporated herein by reference.

FIELD OF THE INVENTION

The present disclosure relates generally to optical sensors and, more specifically, to optical sensors used to measure parameters commonly measured in industrial process or flow systems, parameters like pressure, temperature, flow rate, strain, and material composition.

BACKGROUND OF THE PRIOR ART

Sensors that use fiber optics to provide sensor power and/or transmit sensed information are known. These sensors are useful where conventional electrical sensors that use wires to transmit power and information cannot be used due to limitations such as noise susceptibility or the temperature limits of electronics. Optical sensors show promise, as well. Unfortunately, effective use of optical sensors in applications requiring high accuracy and high resolution has been limited to expensive laboratory type equipment.

For example, sensor designers have been unable to create optical sensors that accurately measure small scale physical displacements, particularly micron and sub-micron displacements. Micron displacement measurement, however, is important in applications like flow systems where commonplace silicon micro electromechanical manufacturing system (MEMS) based sensors measure micron displacements in diaphragms. These sensors use various sensing techniques, such as semiconductor strain gage or variable capacitance. In such sensors, the ability to detect micron-level displacements makes it possible to measure flow, pressure, and other physical and material properties with accuracies exceeding 0.01%.

In contrast to silicon sensors, optical sensors using optical interferometry measure micron displacements to no more than 0.1%. Noise in the optical sensor light source, whether laser light or white-light, is a limiting factor since the intensity variations in a single interference band must be accurately measured to provide a high accuracy signal. Imperfections in the optical interferometer mechanisms in these optical sensors also limits sensor accuracy. Larger displacements may be measured with some accuracy, for example by using fringe counting, but these displacements are still larger than those currently sensed with solid-state sensors. Furthermore, optical sensors fail to measure even these larger displacements if the fringe count memory is lost.

Many optical sensors have a Fabry-Perot configuration, using closely-spaced mirrors that define a free-space resonator region. The movable and highly reflective, but partially transmissive mirrors are used to derive a sensed signal. Other laser sensors with a frequency modulated (FM) output have been proposed as a possible solution to the shortcomings of optical sensors. In general, all these devices fall short of addressing the accuracy problems described above. The combination of frequency noise in the laser mechanism and low gage factor (GF) prevent substantially accurate measurements of small scale displacements. Frequency noise, i.e., random drift in operating frequency, limits the resolution of these lasers. Gage factor is a sensitivity measurement and is defined as $(f_{max}-f_{min})/f_r$, where $f_{max}$ is the output frequency at an upper limit of sensed input, $f_{min}$ is the output frequency at a minimum level of sensed input signal and $f_r$ is the resonant frequency of the system. Low gage factor results in low resolution and undesirable temperature dependence.

A device for modulating laser frequency has been shown having a portion of the laser emission reflected back into the laser from a moving target to effect frequency modulation. The semiconductor diode lasers used exhibit very large frequency noise components, i.e., the base laser frequency varies randomly over a large bandwidth. Further, the external cavity used has a low Q due to limited reflectance from the target. These devices, therefore, are not suitable for measuring small scale displacements in flow systems and other applications.

Another type of laser-based application involves a strain sensing device that utilizes a fiber laser with a cavity defined by Bragg grating reflectors. When strain is imposed on the length of fiber, the lasing frequency of the system changes due to changes in the length of the lasing section. The frequency change that can be measured is limited to the strain that the fiber will withstand, which is typically much less than 0.1%. Furthermore, laser signal drift due to temperature variation and losses in the Bragg reflectors result in loss of accuracy in the measurement of strain.

It is possible to stabilize the frequency of a laser by raising the Q of the mechanism that determines the lasing frequency. In effect, a highly tuned filtering action is achieved which allows only a single frequency to be amplified. This can be achieved by either raising the Q of the lasing cavity itself or by coupling a laser with a low Q cavity to an external cavity with a high Q. A few low noise lasers have been shown in which a high Q micro-cavity, such as a quartz microsphere, emits a stabilized laser signal. These devices, however, have no mechanism for measuring displacement or sensing a physical or material parameter.

As the foregoing indicate, the performance of prior art optical sensors falls below that of the conventional electronic devices that are used in applications like flow systems to measure small scale micron and sub-micron displacements. Thus, while a sensing system based on an optical resonator with a high Q and high gage factor theoretically may provide performance exceeding that of conventional electronic based sensors, none have been shown.

SUMMARY OF THE INVENTION

In accordance with an embodiment, provided is an optical sensor apparatus for use with a mode-locked laser source propagating pulsed laser energy characterized by a repetition rate and for measuring a measurable parameter. The optical sensor apparatus has an optical resonator disposed to receive at least a portion of the pulsed laser energy, the optical resonator having a sensing surface responsive to changes in the measurable parameter at the sensing surface and the optical resonator defining a cavity forming a variable gap that varies in response to the sensing surface and that is positioned such that the repetition rate of the pulsed laser energy changes in response to changes in the measurable parameter.

In accordance with another embodiment, provided is an optical sensor for use with a laser source in measuring a measurable parameter. The optical sensor apparatus has an optical resonator having a sensing surface responsive to changes in the measurable parameter at the sensing surface, the optical resonator defining a resonant frequency that is dependent upon the measurable parameter at the sensing surface, the optical resonator being disposed such that a laser signal from the optical sensor apparatus has a frequency at the resonant frequency, the optical resonator further defining a cavity forming a variable gap that varies in response to the sensing surface.

In accordance with yet another embodiment, provided is an apparatus for modulating, based on a measurable parameter, the output of a laser source producing a laser energy. The apparatus has a coupler coupled to receive the laser energy. The apparatus also has an external high Q resonator characterized by a resonant frequency that varies in response to changes in the measurable parameter, the high Q resonator coupled to the coupler for modulating the laser energy into an information carrying laser signal having a frequency at the resonant frequency of the high Q resonator.

In accordance with another embodiment, provided is a variable frequency resonator comprising an optical resonator having a sensing surface and having a waveguide having a cavity defining a variable gap, the optical resonator characterized by a resonant frequency that is dependent upon the variable gap which is disposed to alter the resonant frequency of the optical resonator in response to changes in the measurable parameter at the sensing surface.

In accordance with another embodiment, provided is a method of sensing a measurable parameter. The method comprises the steps of (1) providing a laser signal; (2) providing a resonator characterized by a resonant frequency; (3) providing a variable gap that varies in response to changes in the measurable parameter, where variations to the variable gap alter the resonant frequency; (4) propagating at least a portion of the laser signal through the resonator such that the laser signal has a frequency at the resonant frequency; and (5) sensing changes in the measurable parameter, such that said sensed changes to the measurable parameter alter the frequency of the laser signal.

In accordance with another embodiment, provides is a method of sensing a measurable parameter. The method comprises the steps of (1) providing a pulsed laser signal characterized by a repetition rate; (2) providing a resonator; (3) providing a variable gap that varies in response to changes in the measurable parameter; (4) propagating at least a portion of the pulsed laser signal through the resonator; and (5) sensing variations in the variable gap such that the repetition rate of the pulsed laser signal changes in response to variations in the variable gap.

In accordance with another embodiment, provided, for use with a light source, is an optical resonator having a variable gap that varies in response to changes in a measurable parameter, the optical resonator receiving light energy from the light source to alter a characteristic of the light energy in response to variations in the variable gap.

DETAILED DESCRIPTION OF A PREFERRED EMBODIMENT

Below are described various apparatuses and methods that address the above-described problems. Generally, provided are lasers, preferably operating in a pulsed output mode, that produce a laser signal of a repetition rate or frequency modulated by a measurable parameter. By using a mode locked laser conventional high-speed electronics can be used to measure the modulated signal and the repetition rate or frequency of the laser signal can be measured with high resolution. By measuring the frequency of the laser signal, a value for the measurable parameter can be derived.

In some embodiments, a high Q optical resonator produces the laser signal with a frequency dependant upon the measurable parameter. The high Q resonator can be internal or external to the laser. The devices have lower power consumption and improved accuracy over the state of the art. The devices may be used to measure changes in a measurable parameter or they may be used to make absolute measurements. Further applications and further embodiments will be apparent to persons of ordinary skill in the art. For example, the devices described may be adapted for use as tuneable optical filters, tuneable laser sources, and other all optical applications.

Figure 1:
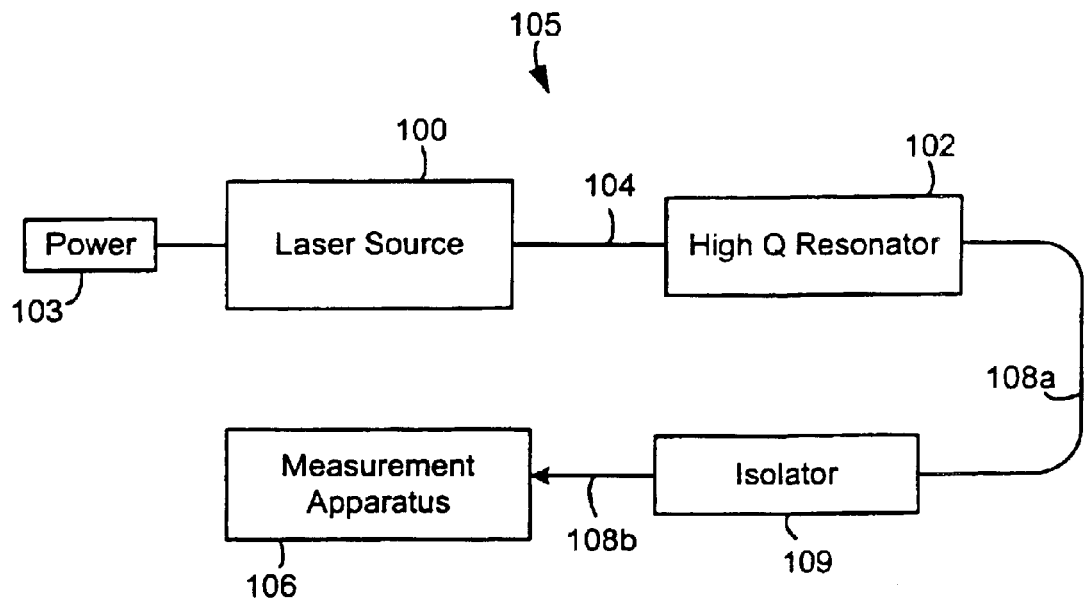
FIG. 1 is a block illustration of an external high Q resonator coupled to a laser in accordance with an embodiment.
Figure 2:
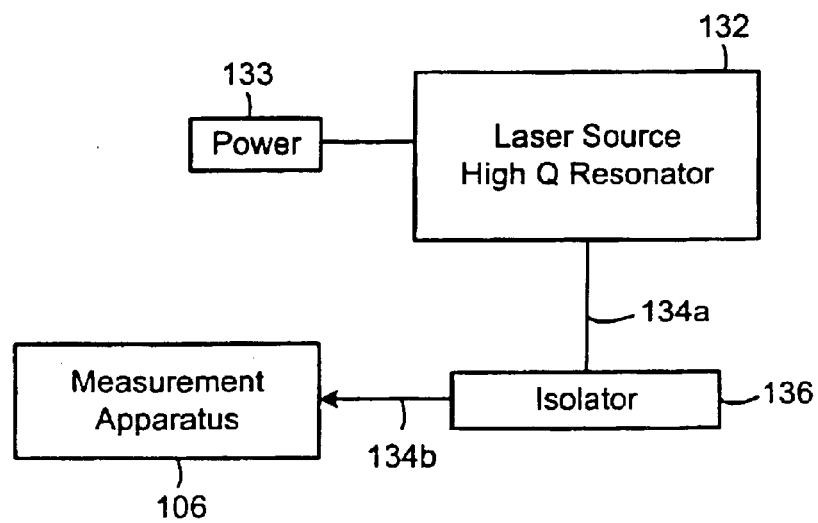
FIG. 2 is a block illustration of a laser with an internal resonator according to an embodiment.

FIGS. 1 and 2 show exemplary embodiments. FIG. 1 shows a laser 100 coupled to an external high Q resonator 102 through a coupler 104, generally shown. The laser 100 may be a fiber-doped laser, a ruby laser, or a diode laser. Other laser sources are contemplated. The laser 100 may be an amplification stage, such as an optical parametric amplifier or fiber amplifier stage pumped by a laser source. The laser source 100 may also be replaced with a light emitting diode (LED). By way of example only, the laser source 100 is shown receiving power from a power source 103, which as it would be understood by persons of ordinary skill in the art may take the form of an optical or electrical power source. The laser energy is preferably at a wavelength in the visible or infrared region, though the laser energy may be within the far-infrared and microwave regions as well.

In the preferred embodiment, the coupler 104 is an optical fiber or optical waveguide, and coupling is achieved through low-loss evanescent coupling. Coupling may be achieved through partially transmissive mirrors, waveguide taps, or other known means for coupling optical signals.

The laser source 100 provides a laser energy to the high Q resonator 102 through the coupler 104. The laser energy coupled from the laser 100 to the resonator 102 is at a wavelength corresponding to the resonance of the laser cavity within the laser 100. Such laser cavities, however, have low Q and produce an output of relatively large bandwidth. The Q of the external resonator 102 is preferably substantially higher than the Q of the laser cavity within the laser 100. For example, in the preferred embodiment, the Q of the resonator 102 would be at least 100. Typical resonators only have Q values between 3 and 100 and are limited by the mirrors forming the resonant cavity and the desired power output.

It is generally known that a low Q oscillator system will lock onto the frequency of a high Q resonator if there is sufficient coupling between the oscillator and the resonator and if the frequency ranges of the two regions overlap. The low Q laser cavity of laser 100 locks onto the resonance frequency of a high Q resonator 102. That is, the exchange of energy between the high Q resonator 102 and the lower Q laser 100 will lock the laser signal of the entire system to a frequency and bandwidth defined by the resonator 102. The result is that the system produces a laser signal of a narrow bandwidth and centered at a resonance frequency of the resonator 102.

The laser source 100 may be a continuous wave (CW) source or a preferably a pulse mode locked laser source. If the source 100 is a CW source, then the laser signal from the system locks onto the resonant frequency of the resonator 102 and has a narrowed bandwidth induced by the high Q of the resonator 102. Here, a spectrometer would be used to measure the frequency of the laser signal. If the source 100 is a pulse mode locked laser source, the resonator 102 additionally determines the repetition rate of the pulse train. Here, conventional electronic detectors can be used to measure the sub 100 GHz repetition rate.

Optical resonators have multiple resonant frequencies. It is desirable, however, that only a single resonant frequency be located within the bandwidth of the laser energy supplied by the laser sources. That is, the laser signal exists at a single consistent resonant frequency. This condition will reduce the mode hoping that occurs in some state of the art laser systems. A distributed feedback laser (DFB) laser may be used as the laser source 100 to achieve a bandwidth that allows a single resonant frequency. The physical parameters of the resonator 102 could be altered to achieve single resonance, as well.

The resonator 102 is formed of an optically transparent material. The material may be a lasing material or a non-lasing material. Suitable materials include sapphire, quartz, doped quartz, polysilicon, and silicon. These materials exhibit low optical losses. These materials also exhibit good mechanical properties that respond precisely and consistently to changes in the measurable parameters and do not permanently deform under pressure or force, but instead return to their original shapes after the measurable parameter has returned to a steady stated value. Preferably, materials that allow propagation under total internal reflection are used. The total internal reflection and low optical losses allow for very high Q resonators.

The resonator 102 is characterized by having resonant frequencies that depend upon measurable parameters near the resonator 102. Herein, "measurable parameters" means those parameters associated with an external force or pressure. Pressure (absolute and differential), temperature, flow rate, material composition, force, and strain are examples. Laser source 100 and high Q resonator 102 collectively form an optical sensor 105, which produces a laser signal or sensed signal, dependent upon a measurable parameter.

The laser signal is supplied to a measuring apparatus 106 through structure generally shown as couplers 108a and 108b and isolator 109. If the laser source 100 is a pulse mode locked laser, the measuring apparatus 106 could be a conventional high-speed electronics detector. If the laser source 100 is a continuous wave source, the measuring apparatus 106 is preferably a spectrometer or other suitable device for measuring signal frequency.

The isolator 109 prevents back reflected signals of the measuring apparatus 106 from entering into the resonator 102. As the laser signal is dependent upon a measurable parameter, the measuring apparatus 106 may additionally derive a value for the measurable parameter by measuring the frequency or repetition rate of the laser signal and calculating a measurable parameter value corresponding to that measurement. This derivation is performed in known ways. The coupling between the resonator 102 and the measuring apparatus 106 may be achieved through fiber coupling, mirror coupling, taps, evanescent coupling or other suitable coupling types.

The resonator 102 has a high Q value and, therefore, the energy coupled between the laser 100 and the resonator 102 may be very low and proper locking onto a resonant frequency of the resonator 102 will occur. Another advantage of using the high Q external resonator 102 is that the signal/noise (S/N) ratio of the system improves. Generally, the SIN ratio and resolution of a frequency modulated laser system is limited by the frequency jitter in the lasing mechanism. This jitter has many sources; mode hoping, power supply noise, thermal noise, quantum fluctuations and gain noise in the lasing media are a few. Amplitude noise fluctuations modulate the lasing frequency itself so that the resulting frequency noise cannot be filtered out once it has been generated.

By way of example, the S/N ratio is proportional to the GF, defined above, under the following proportionality: $S/N = GF \cdot f_r / f_n$. The value $f_n$ is the noise frequency dither inherent in $f_r$. A high GF results in a high SIN ratio. Coupling a laser output into an external high Q resonator, like resonator 102, means that laser output frequency will be determined by the resonator and, therefore $f_n$ will be low and the S/N ratio characteristics will be determined primarily by the characteristics in the external resonator. The resonators shown herein are also characterized by high GF and therefore high S/N ratio.

The external resonator structure of FIG. 1 is useful to make measurements in environments hostile to laser operation, because the sensing mechanism (i.e., the resonator 102) is remote to the laser source 100. Also, in this embodiment, the external resonator 102 is not susceptible to the high temperatures produced by the laser source 100.

FIG. 2 is block depiction of an alternative embodiment of an optical sensor 130, in which a laser 132 is formed of an internal high Q resonator. Here, the high Q resonator forms the laser 132 and, therefore, functions as the laser gain cavity. The high Q resonator is formed of a material that lases upon being pumped by an appropriate feed energy. By way of example only, the laser source 132 is shown receiving power from a power source 133, which as it would be understood by persons of ordinary skill in the art may take the form of an optical or electrical power source. Semiconductor materials, doped sapphire, doped quartz, and other materials may also be used to form the internal resonator. Doped quartz is particularly beneficial because when quartz is doped with the rare earth element erbium the quartz can be made to emit laser light of 1550 nm, i.e., the preferred low-loss wavelength for current optical fiber communications. The laser signal is produced by the laser 132 and provided to the measuring apparatus 106 through couplers 134a and 134b and an isolator 136, similar to that described above.

Provided in a preferred embodiment is a frequency modulated laser source that produces a pulse train as the laser signal. The repetition rate of the pulses varies as a function of a measurable parameter acting on a resonator, and, therefore, the entire structure forms a high resolution and high accuracy optical sensor. For example, simply counting of a 1 GHz change (induced by a change in a measurable parameter) in a 100 GHz signal would give a resolution of 1 ppb over a 1 second measurement. State of the art lasers have noise bandwidths of a few KHz with a base frequency of about 200,000 GHz, indicating that a resolution of more than 30 bits is attainable with such an optical sensor.

There are various ways known in the art to set-up a mode-locked laser such as using either passive mode-locking or active mode-locking. Ti:Sapphire mode-locked lasers pumped with an Argon continuous wave laser source or pumped with a Nd:Yag laser continuous wave source have been shown. Others have shown passive mode-locking using semiconductor lasers and micro-mechanical tuning. Any mode-locked laser would be suitable as the laser source 100 of FIG. 1 and various mode-lock laser set-ups may be used in the embodiment of FIG. 2. Thus, pulse mode locked operation is contemplated in both the external and internal resonator embodiments.

Figure 3A:
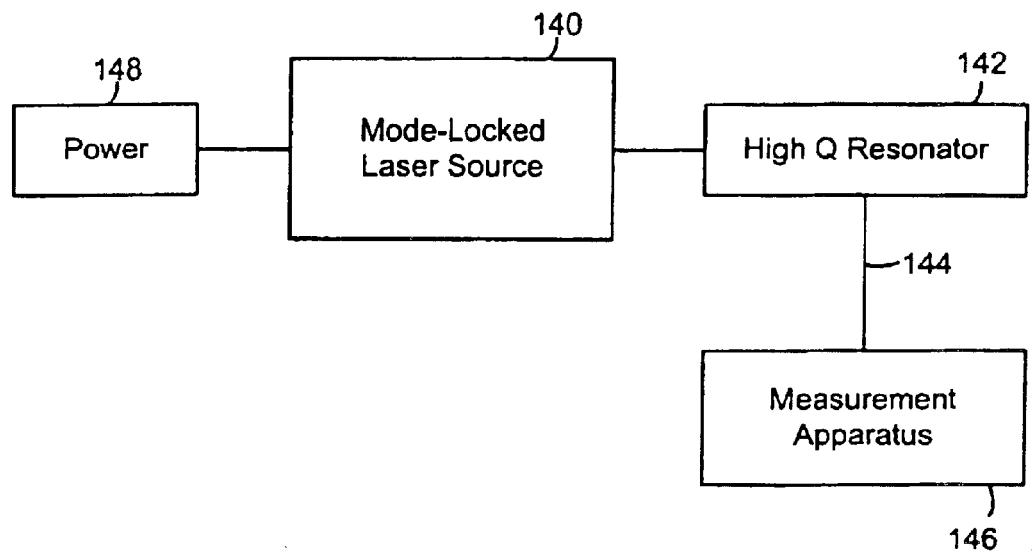
FIG. 3A is a block illustration of a mode-locked laser having an optical gain medium in accordance with an embodiment.

An exemplary mode-locked laser is shown in FIG. 3A, showing a laser 140 coupled to an external High Q resonator 142 for producing a mode-locked laser signal 144 at an operating frequency related to a measurable parameter acting on the resonator 142. The laser 140 includes a mode-locking mechanism, which can take a variety of forms as known in the art. For instance, a saturable amplifier can be introduced into the lasing cavity such that only short pulses are able to pass without attenuation. The laser signal 144 is a pulsed laser signal having a repetition rate dependent upon the measurable parameter acting on a sensing (e.g., outer) surface of the high Q resonator 142. In particular, pulsed laser signals 144 of the laser 140 locked to the external high Q resonator 142 have a repetition rate determined by $F=F_{in}(1-h/nL)$ where h is the round trip length of the external resonator, L is the round trip length of the mode locked laser, n is the effective refractive index, and $F_{in}$ is the round trip frequency of the mode locked laser. (See "Passively Mode-Locked Micromechanically-Tunable Semiconductor Lasers", Katagirie et al., IEICE Trans. Electron., Vol. E81-C, No. 2, February 1998). A measuring apparatus 146 measures this repetition rate and uses that measurement to derive a value for the measurable parameter. The laser 140 is exemplarily shown being pumped by a power source 148, which represents any of the known sources of pump energy for a mode-locked laser.

Figure 3B:
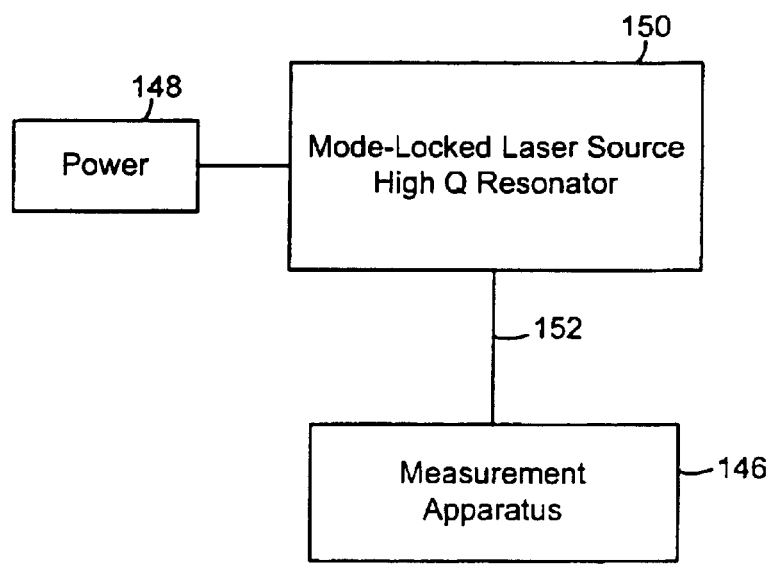
FIG. 3B is a block illustration of a mode-locked laser having an optical gain medium in accordance with an embodiment.

Referring to FIG. 3B, a mode locked laser 150 may alternatively incorporate the high Q resonator internal to the lasing cavity (similar to FIG. 2) to produce the mode locked laser signal 152. With this internal resonator structure, the repetition rate of the laser signal 152 is simply the round trip time of the resonator. As noted above, the mode locking mechanism of the laser 150 can be accomplished through a variety of techniques known in the art such as introducing a saturable amplifier section into the loop or using active mode locking. The measuring apparatus 146 then measures the repetition rate of the laser signal 152 to derive a value for the measurable parameter acting on a sensing surface of the laser/resonator. Though not shown, the embodiments of FIGS. 3A and 3B may be implemented with isolators and other optical components (such as varied optical couplers) as desired.

Some exemplary resonator structures characterized by a resonant frequency dependent upon a measurable parameter will now be discussed.

Figure 4:
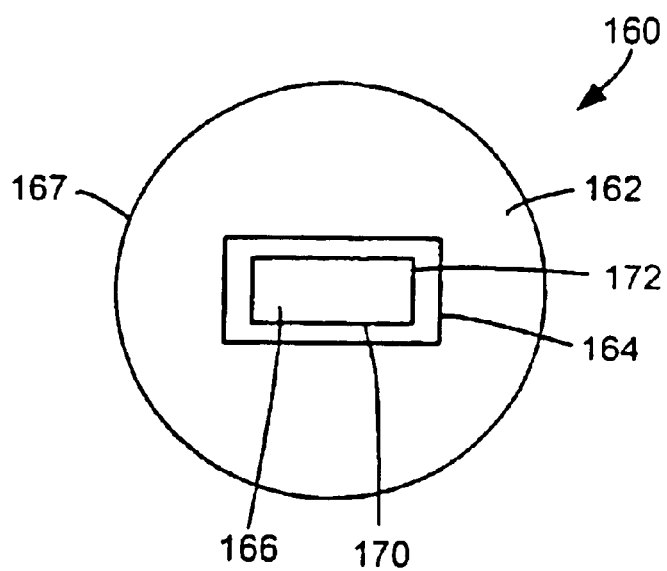
FIG. 4 is a cross-sectional view of an optical fiber in accordance with an embodiment.
Figure 5:
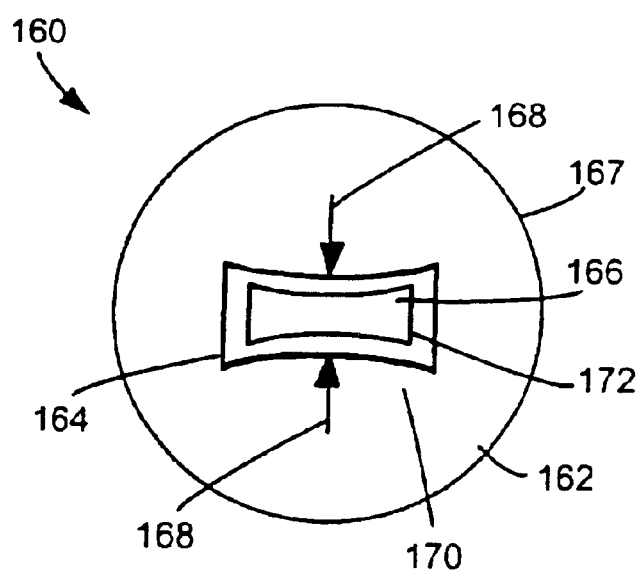
FIG. 5 is a cross-sectional view of the optical fiber of FIG. 1 after a measurable parameter has changed at a sensing surface of the fiber.

FIGS. 4 and 5 depict a cross section of an optical fiber 160 that may be used to form the resonator 102 or 132. The optical fiber 160 may be formed of any of the standard materials used in optical fibers and is preferably a single mode fiber. The optical fiber 160 is characterized by a cladding region 162 and a higher index of refraction core region 164. This configuration confines propagation primarily to the core 164 and a signal propagating within the core 164 propagates under total internal reflection.

Figure 9:
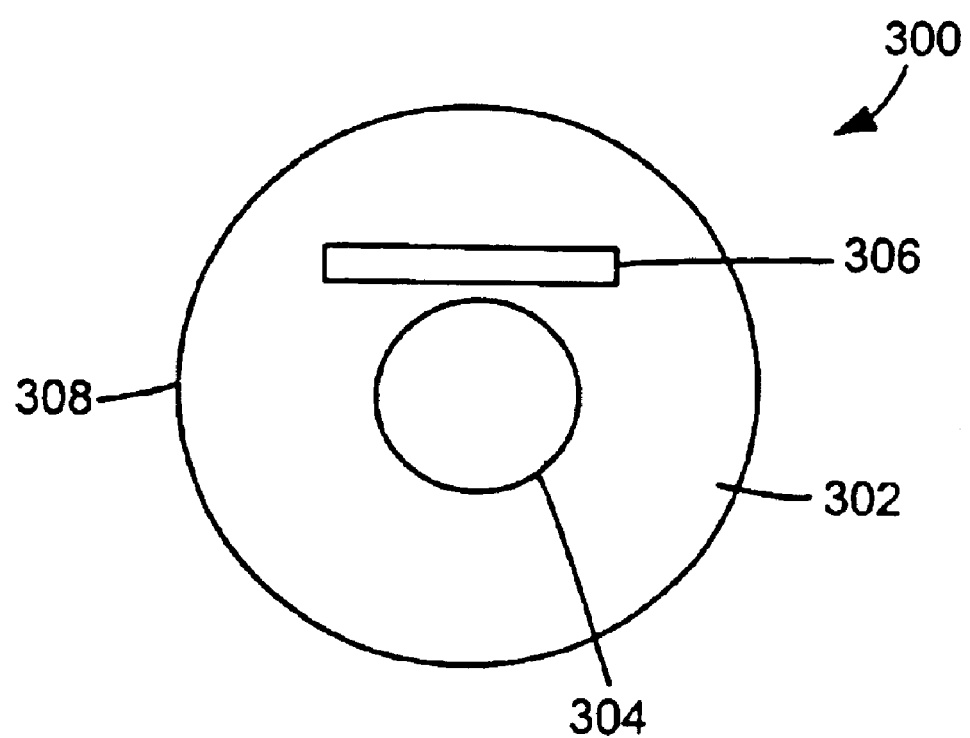
FIG. 9 is a cross-sectional profile of an optical fiber in accordance with an embodiment alternative to that of FIGS. 4 and 5.

The optical fiber 160 contains a cavity 166 defining a variable gap, which may be evacuated or contain a gas or other suitable material. The cavity 166 is formed in the fiber 160 through known processing methods, such as etching or drawing down a blank or preform that includes the cavity. In FIG. 4, the cavity 166 is entirely disposed within the core 164. The cavity 166 may also be partially within the core 164 or entirely external to the core 164, as shown in the embodiment of FIG. 9. In the preferred embodiment, the cavity 166 is similarly shaped in cross-section to that of the core 164. Also, in a preferred embodiment the cavity 166 would be symmetric to the core 164. While both the cavity 166 and the core 164 are shown with a rectilinear cross-section, it would be understood that other cross-sectional profiles may be used. For example, other shapes for the cavity could be used such as a multiplicity of closely spaced round holes which change size in response to a sensed variable or measurable parameter. The cavity 166 extends longitudinally with the core 164 along at least a portion of the fiber 160.

The gap of the cavity 166 varies in response to changes in measurable parameters, for example, changes in pressure or force external to the fiber 160. In operation, an increase in the pressure on the outside of the fiber 160 applies force to an outer wall or sensing surface 167 of the fiber 160, which results in radial forces being applied through the cladding region 162 and on the cavity 166. Due to the geometry of the cavity 166, some of the radial forces will not alter the cavity shape. Other forces, principally forces represented by arrows 168 (see, FIG. 2), will act to compress the cavity 166. Therefore, an increase in pressure at the sensing surface 167 of the fiber 160 will result in the compression, i.e., inward displacement, of the cavity 166. Though, not shown it would be understood that a decrease in pressure would result in an expansion of the cavity 166.

Changes in the other measurable parameters would alter the cavity 166, as well. For example, the fiber 160 may be placed within a processing flow system such that changes in flow rate, temperature, or material composition alter the geometry of the cavity 166. Changes in any of the measurable parameters would result in changes in the variable gap of the cavity 166. The cavity 166, therefore, provides an alterable perturbation within the propagating core 164, a perturbation that alters in response to a measurable parameter.

It is preferred that the cavity 166 have a cross-sectional shape that can be compressed and decompressed in response to relatively small changes in the measurable parameter. It is also preferred that the cavity displacements be relatively small, i.e., in the micron and sub-micron range so that the propagation characteristics within the core 164 change a detectable amount, but not an amount that will detrimentally affect the mode profile of a wave propagating within the core 164. In the examples of FIGS. 4 and 5, an elongated rectangular profile is used for the cavity 166. The cavity 166 has a first side 170 longer than a second side 172. The cavity 166 has dimensions on the order of the wavelength(s) to propagate within the fiber 160. The steady state cavity profile (e.g., at atmospheric pressure) can be changed depending on the desired sensitivity and the parameter to be measured.

Changes to the shape of the cavity 166 will alter the propagation characteristics within the core 164. In particular, a wave traveling within the core 164 experiences a particular index of refraction within the core 164. A fiber core is typically characterized by a material dependent index of refraction. A wave propagating within the core 164 experiences an effective index of refraction that is dependent upon the various materials that the wave propagates through. A propagating wave has an electric field that passes primarily through the core 164 and cavity 166 but also extends substantially into the cladding 162. The energy stored in the electric field is thus dependent on the refractive indices and geometries of the three regions, and the energy stored in the electric field determines the velocity of propagation of the electromagnetic wave along the length of the fiber 160. The propagating wave thus behaves as though it is traveling through a uniform material with an effective index of refraction that is a geometry weighted average of the index of refraction of the three regions. The effective index of refraction experienced by a propagating wave changes with changes to the geometry, i.e., compression or expansion of the cavity 166. Described now are some exemplary applications in which the change to the effective index of refraction of a wave propagating in a core can be used in an optical sensor.

Figure 6:
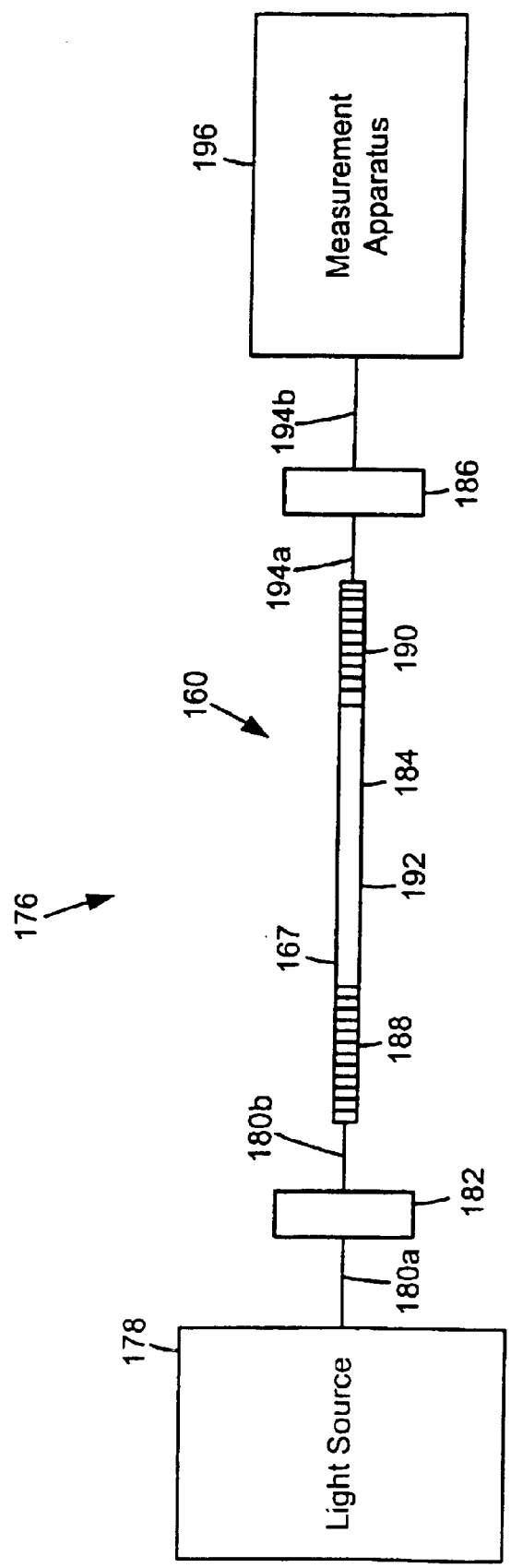
FIG. 6 is an illustration of the optical fiber of FIG. 4 used in an optical sensor in accordance with an embodiment.

FIG. 6 shows the fiber 160 of FIGS. 4 and 5 in a optical sensor 176. The structure may also be considered an apparatus of modulating laser signal frequency. The depicted configuration is similar to that of the laser system of FIG. 1. The optical sensor 176 has a light source 178 supplying an output to the fiber 160 through an isolator 182 and couplers 180a and 180b. Preferably, a semiconductor laser or LED source is used as the light source 178. The source 178 could be a continuous-wave laser or a pulse mode locked laser, though in the latter case the optical medium forming the fiber 160 is not a lasing medium. The fiber 160 is doped to form a lasing material, and the output from the source 178 is a pump energy of a wavelength sufficient to allow lasing action in the fiber 160.

The fiber 160 has a middle portion 184 over which changes to a measurable parameter are measured. A first end of the fiber 160 has a first reflector in the form of Bragg reflector 188 and a second end has a second reflector in the form of Bragg reflector 190. The middle portion 184 extends between the Bragg reflectors 188 and 190 and coincides with the sensing surface 167. The Bragg reflectors 188 and 190 define a resonator 192 within the optical fiber 160. In the depicted environment, the resonator 192 extends along the length of the optical fiber coinciding with the middle portion 184 and extending slightly into the Bragg reflectors 188, 190. In the preferred embodiment, the cavity 166 (not shown) does not extend into the Bragg reflectors 188, 190. However, the cavity 166 may extend into the Bragg reflectors 188, 190 if desired. Though shown as Bragg reflectors 188 and 190, the first and second reflectors could alternatively be mirrors or other highly reflective structures formed on the fiber 160 or external thereto.

In operation, the pump energy produced by light source 178 is supplied to the resonator 192 through the partially transmitting Bragg reflector 188. A laser signal emits from the Bragg reflector 190 along couplers 194a and 194b and through isolator 186. The laser signal has a wavelength corresponding to a resonance frequency of the resonator 192. The frequency of the signal on coupler 194b is measured by a measuring apparatus 196.

Upon a change to a measurable parameter at the sensing surface 167, specifically over the middle portion 184, the cavity 166 will be altered and thereby alter the effective index of refraction experienced by a signal propagating within the core 164. The effective index of refraction will determine the velocity of propagation of the light wave in the resonator 192. This in turn will determine the resonant frequency of the resonator 192 and, therefore, the frequency of the laser signal on coupler 194a in CW operation. In mode-locked operation, the repetition rate is altered. Changes to a measurable parameter will be detected by the detector 196 in the form of changes in the frequency of the laser signal.

In CW operation of the sensor 176, the measurement apparatus 196 is a detector in which the laser signal frequency is compared to the frequency of a reference laser to allow for the measurement of very fine changes to the frequency of the laser signal. In pulse mode operation, the measurement apparatus 196 is an electronic detector that measures changes in the repetition rate of the laser signal pulse train. In either case, cavity displacements of a micron or below will result in frequency changes that can be measured by the detector 196. Though not shown, a CPU or other processor is used to compute a value for the measurable parameter based on the detected laser signal frequency. Changes in measurable parameters are detectable as well as absolute measurements. It would be understood, that an initial normalization may be used to calibrate the detector 196 and/or processor for accurate measurements the measurable parameter. For example, a normalization may be performed before a different measurable parameter is to be sensed. It would be further appreciated that multiple sensors can be used with a processor to make varying sorts of other measurements, like measuring $\Delta P$ between two separate locations within a flow system. With a typical gage factor of 0.01 to 0.1 and a Q of 160 or more measurements with 0.01% to 0.001% resolution may be made with the sensor 176.

Figure 7:
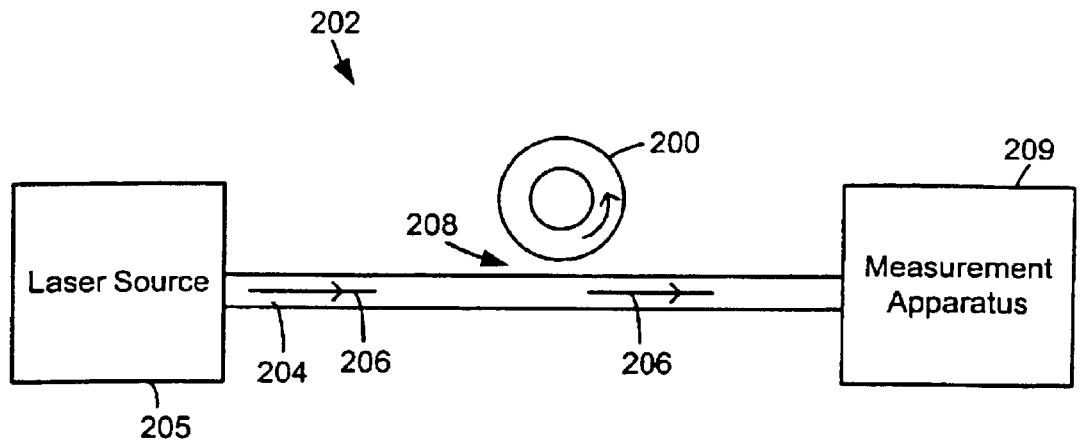
FIG. 7 is an illustration of a ring resonator in accordance with an embodiment.

Alternative resonators are contemplated. An example of an alternative resonator is shown in FIG. 7. Here, a waveguide could 200 forms a circular resonator also known as a circulator or ring resonator and will be termed as such henceforth. The ring resonator 200 may be formed by joining ends of a optical fiber using commercially available fusing techniques in the preferred embodiment. The ring resonator 200 has a cladding, core region, and cavity like those of the optical fiber 160 when viewed in cross-section. The ring resonator 200 is characterized by high Q and high gage factor and forms part of an optical sensor 202. If the cavity extends the entire length of the ring resonator 200, then the entire outer surface of the ring resonator 200 would act as a sensing surface.

Coupling of a signal into the closed loop of the ring resonator 200 is achieved through evanescent coupling. A primary waveguide 204 is brought within evanescent coupling contact of the ring resonator 200 over a region generally shown by reference numeral 208. The waveguide 204 is an optically transparent waveguide formed, for example, of a polysilicon material. Sapphire and quartz would also be useful for creating total internal reflection propagation and the waveguide could be another optical fiber. A laser signal 206 from laser source 205 is made to propagate through the waveguide 204.

The signal 206 locks onto the resonant frequency within the resonator 200 and has a narrow bandwidth induced by the coupling into the resonator 200. The signal 206 therefore is dependent upon the properties with the resonator 200, i.e., it is dependent upon a measurable parameter at an outer surface of the resonator 200. Signal 206 is provided to a measurement apparatus 209, such as those described above. It is noted that in one embodiment the ring resonator 200 may be formed from a lasing material such that the resonator constitutes the laser cavity such as shown in the internal resonator embodiment of FIG. 2.

Figure 8:
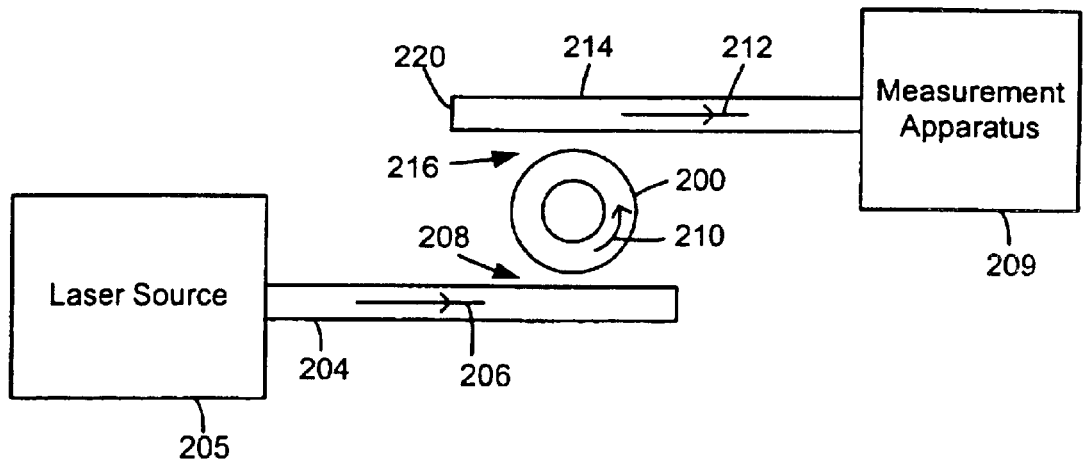
FIG. 8 is an illustration of a ring resonator in accordance with another embodiment.

An alternative embodiment is shown in FIG. 8, in which a signal 210 propagating with the resonator 200 is coupled as signal 212 to a secondary or output waveguide 214 that is within coupling contact with the ring resonator 200 over a region generally shown as 216. This embodiment is particularly useful where the resonator 200 is formed of a non-lasing material. The output waveguide 214 is outside of coupling contact with the waveguide 204. To direct the signal 212, the waveguide 214 has a snubbed end 220 and extends distally therefrom, so that the signal 212 propagates in a parallel direction to that of the signal 206. The signal 212 is coupled to the measuring device 209. The ring resonator 200 and waveguides 214 and 204 are preferably created during the same overall process to reduce device cost and fabrication times.

The embodiment of FIG. 8 may be particularly useful in filtering out a wavelength from an incoming signal. For example, with signal 206 as a broad bandwidth LED energy or a white light energy, the resonator 200 would remove that part of the propagating energy coinciding with the resonance frequency and bandwidth of the resonator 200. The signal 212 would be at the removed frequency. With resonator 200, near complete removal of the resonant frequency from the signal 206 is achievable.

FIG. 9 shows a suitable alternative embodiment to FIGS. 4 and 5 of a fiber 300 having a cladding region 302, a core 304 and a cavity 306. The outer surface 308 is the sensing surface of the fiber 300. The cavity 306 defines a variable gap similar to that of the cavity 166 in that the cross sectional profile of the gap changes in response to changes in measurable parameters. Here, however, the cavity 306 is disposed entirely within the cladding region 302. The cavity 306 is nonetheless close enough to the core 304 to change the effective index experienced by a signal propagating therein. As with the above embodiments, changes to the cavity 306 induced by changes in measurable parameters would alter the effective index. Thus, the fiber 300 can be used in a resonator or laser cavity to produce an output signal that is dependent upon measurable parameters. The fiber 300 is suitable for use in the Bragg reflector resonator or the ring resonator configurations described above, as well as other resonator configurations. As with the fiber 100, the core 304 would be formed of higher index optically transparent material, preferably transparent in the infrared region. The core 304 and the cavity 306 can have different cross sectional profiles and still achieve the desired dependency of the resonant frequency upon changes in the measurable parameters.

Figure 10:
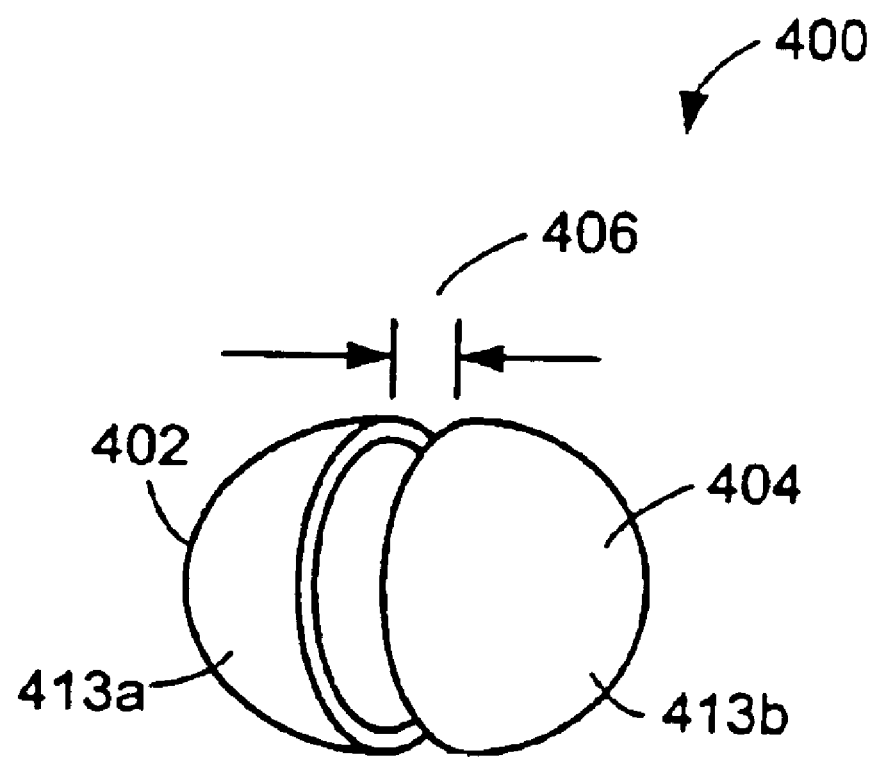
FIG. 10 is an illustration of a microsphere resonator in accordance with an alternative embodiment.
Figure 11:
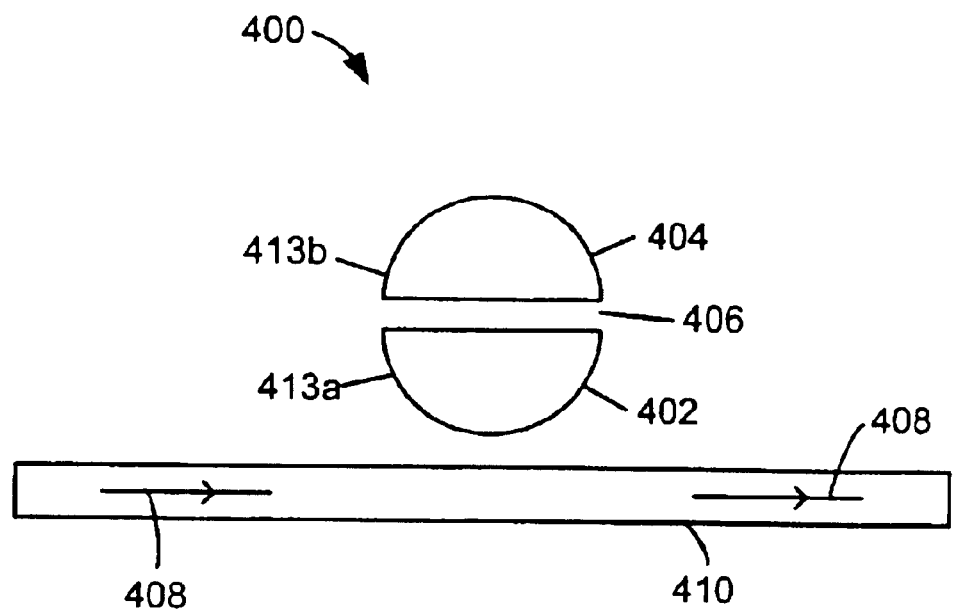
FIG. 11 is an illustration of the microsphere resonator of FIG. 10 in an exemplary optical sensor.
Figure 12:
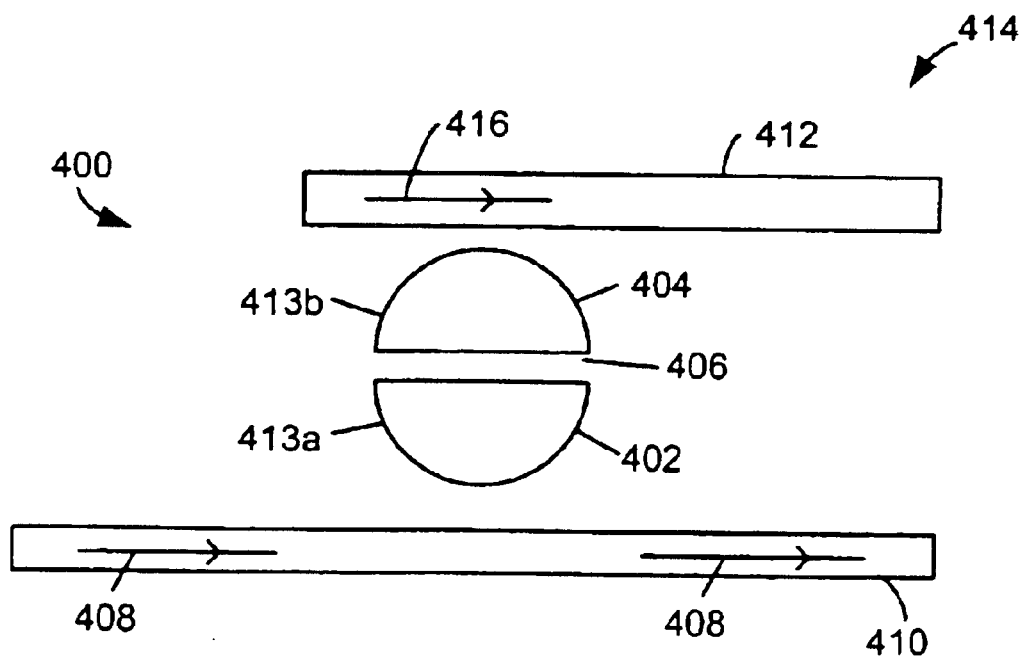
FIG. 12 is an illustration of the microsphere resonator of FIG. 10 in another exemplary optical sensor.

Another type of resonator encompassed within the present teachings is a microsphere resonator such as resonator 400 shown in FIGS. 10–12. Optical microspheres are known to have exceedingly high Q values, exceeding 1,000,000,000. Microspheres, therefore, provide an ideal resonator for measuring very small changes in a measurable parameter. Known microspheres, however, are formed of unitary structures without gaps or spacings that can be made to vary.

The microsphere 400 is hollow and operates in a whispering gallery mode where light travels along the outer surface of the microsphere 400 like known microspheres. Light is confined by total internal reflection at the surface of the sphere. The microsphere 400 is separated into a first hemisphere 402 and a second identical hemisphere 404, and the two hemispheres 402, 404 are separated by a variable gap 406. The gap 406 is small enough such that a signal propagating within either of the hemispheres 402, 404 will be able to couple into the other for propagation therein.

The microsphere 400 is characterized by a resonant frequency defined by the hemispheres 402 and 404. The spacing of the gap 406 affects the resonant frequency in a similar manner to that of cavity 166 on fiber 160. Referring to FIG. 11, a portion of a laser signal 408 propagating in waveguide 410 is coupled into hemisphere 402. The laser signal 408 will lock onto the resonant frequency within the high Q resonator 400. In operation, as a measurable parameter changes at sensing surface 413a and/or 413b, the variable gap 406 will vary the spacing between the hemisphere 402 and the hemisphere 404 and thereby alter the resonant frequency of the microsphere 400. The resulting variation in the variable gap 406 alters the output frequency of the laser signal 408. The signal 408 is coupled to a measuring apparatus, not shown.

FIG. 12 shows an alternative embodiment, in which the microsphere 400 is disposed between two waveguides 410 and 412, and the microsphere 400 functions as a resonant frequency filter or sensor 414 similar to the structure shown in FIG. 8, producing a filter laser signal 416 in waveguide 412.

The microsphere 400 and waveguides 408 and 410 may be formed over a substrate and mounted using mounting means suitable for ordinary microspheres. The hemispheres 402 and 404 are preferably mounted for movement relative to one another. By way of example, MEMS mounting structures may be used for this purpose. A MEMS fabrication process could be used to create an actuation mounting that biases the hemispheres 402 and 404 to a desired variable gap spacing, but that will allow the variable gap spacing to contract and expand in response to small changes in pressure, temperature, etc. The microsphere 400 is preferably formed of a lasing material, like doped quartz. Though, it may be formed of a non-lasing material instead. Multiple microspheres may be used to increase the signal to noise ratio of the output signal measured at the detector. Other modifications will be apparent.

Figure 13:
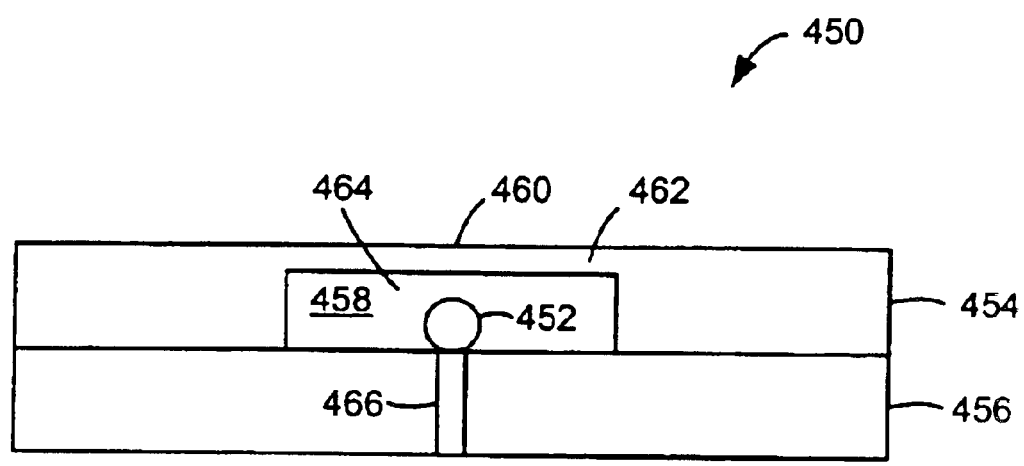
FIG. 13 is a cross-sectional view of an alternative optical sensor having a microsphere.

FIG. 13 shows an alternative optical sensor 450, in the form of an optical sensor capsule, formed with a microsphere 452. In the preferred embodiment, the laser is doped to form a microlaser which lases when excited by pump light. The sensor 450 is comprised of two modules 454 and 456. The first module 454 is formed of a dielectric material and contains a receiving cavity 458. The module 454 has a sensing surface 460 disposed above a flexible membrane or portion 462, such that changes in a measurable parameter at the sensing surface 460 will deflect the membrane 462. The module 456 is formed of a dielectric material and is disposed in contact with the microsphere 452. For example, the microsphere 452 may be disposed in a small spot indentation in the module 456. The microsphere 452 could be supported by a pedestal. The microsphere 452 is preferably a unitary structure and not formed of halves like the embodiments of FIGS. 10–12. The microsphere 452 is positioned below the membrane 462 and collectively the two define a variable gap 464. In this configuration, light is coupled into the microsphere 452 and changes in the variable gap 464, i.e., changes due to changes in the measurable parameter at the sensing surface 460, will affect the resonance condition in the microsphere 452, thereby changing the frequency of a laser source in CW operation or changing repetition rate of a pulsed laser source in mode-locked operation. By way of example, a waveguide 466 is shown for coupling light in and out of the microsphere 452. Alternatively light could be coupled to the microsphere 452 through the transparent module 454 by focusing a light beam unto the microsphere 452.

The ring resonator embodiments like those of FIGS. 7–8 may be formed integral to a substrate, thereby providing a unitary structure protecting the resonator and waveguides from damage. An exemplary integrated optical sensor 500 is shown (unassembled) in FIGS. 14A and 14B having a first module 502 and a second module 504. The first module 502 includes a ring resonator 506 formed using an implantation, an etch and growth, or other suitable processes. In a preferred embodiment, the substrate 508 is formed of sapphire and the ring resonator 506 is formed of gallium arsenide or polysilicon which have higher indices of refraction than sapphire and thus provide total internal reflection. A primary waveguide 510 and a secondary waveguide 512, similar to the waveguides described above with respect to FIG. 8, have also been formed in the substrate 508. The waveguides 510 and 512 and the ring resonator 506 have top surfaces flush with the top surface 514 of the substrate 508. Signals propagating with the waveguides 510 and 512, as well as the ring resonator 506, do so under total internal reflection.

Figure 14A:
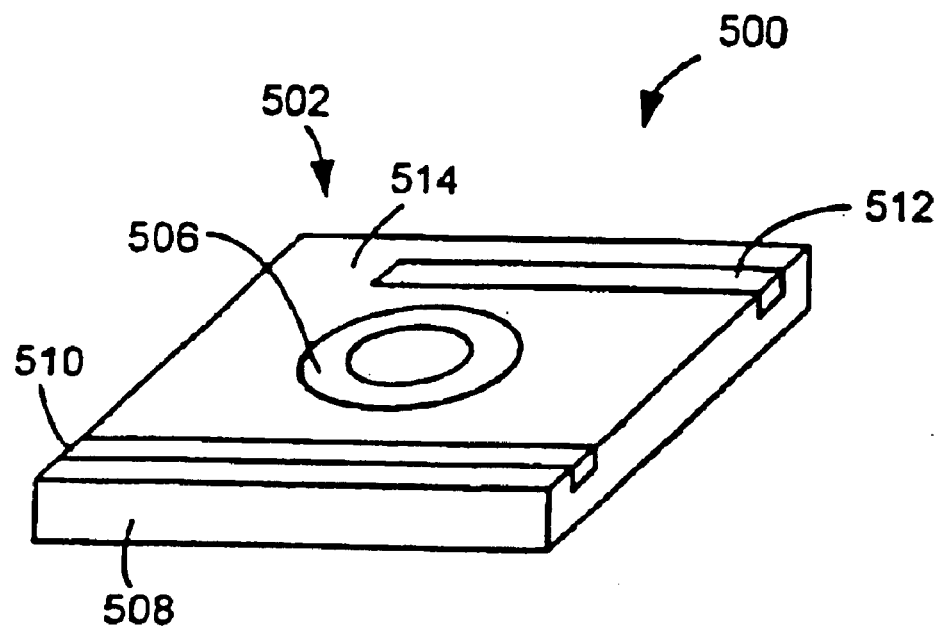
FIGS. 14A and 14B illustrate a perspective view of an unassembled integrated optical sensor with first module and second module in accordance with an embodiment.
Figure 14B:
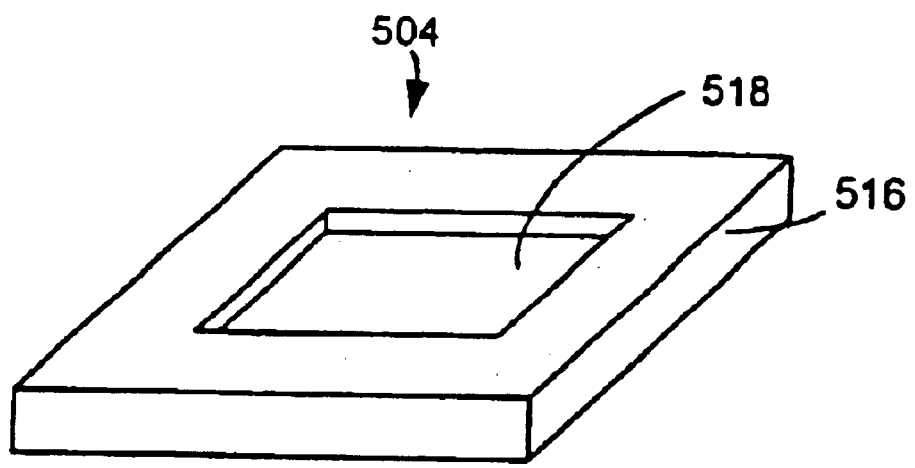

The module 504 is formed of a substrate 516 which in the preferred embodiment would be the same material as that of substrate 508. Module 504 includes a cavity 518 defining a variable gap. As with the cavity 166 previously described, the cavity 518 has a geometry such that the gap of the cavity 518 will vary in response to changes to a measurable parameter, like pressure, force or temperature. Furthermore, while a rectilinear shape is shown in FIGS. 14A and 14B, it will be understood that other shapes are suitable; for example, a non-planar shape may be used. The integrated optical sensor 500 is formed by mounting module 504 on module 502 forming the structure shown in FIG. 15.

Figure 15:
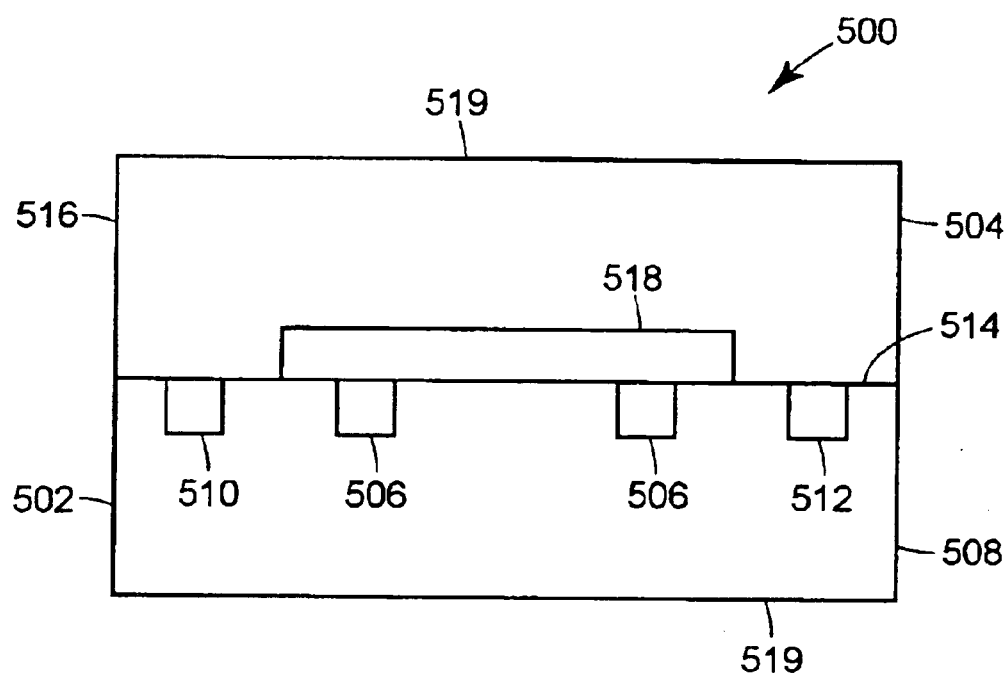
FIG. 15 is a cross-sectional view of the integrated optical sensor of FIG. 14 assembled.

As shown in cross-section in FIG. 15, the cavity 518 is external to the ring resonator 506, but close enough to alter the effective index of refraction experienced by a wave propagating within the ring resonator 506. The shape of the cavity 518 is altered in response to changes to the measurable parameters described above at sensing surfaces 519, and variations in the variable gap change the resonant frequency of the resonator 506. The module 504 may, for example, form a diaphragm above the resonator 506. The output signal on waveguide 512 is coupled to a detector and processor. The configuration could be used in a CW or pulse mode operation in accordance with the above teachings.

Numerous alternatives to the optical sensor 500 will be apparent to persons of ordinary skill in the art. For example, a Bragg grating may be formed on a surface of the resonator 506 to further narrow the bandwidth of the output signal from waveguide 512 or otherwise affect operation. The ring resonator 506 could be doped to provided integral lasing action or the ring resonator 506 could be coupled to an external laser to provide a variable frequency output. Additionally, concentric ring resonators may be used, for example, to compensate for temperature fluctuations. This alternative is particularly useful as each of the concentric ring resonators would have different pressure sensitivities due to differing geometries (in this case radii).

Figure 16:
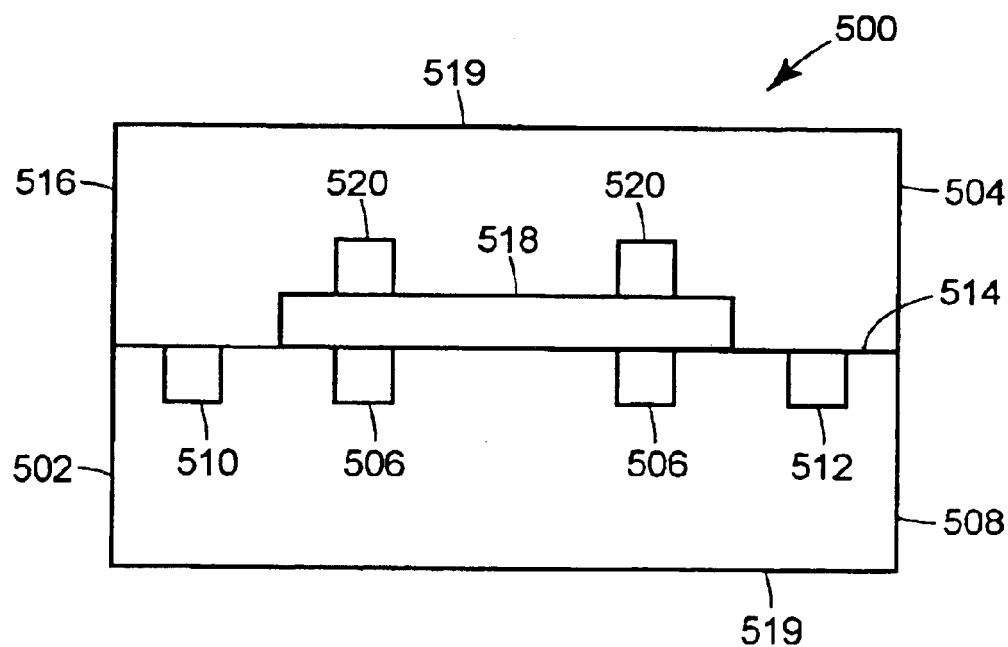
FIG. 16 is a cross-sectional view of the an alternative integrated optical sensor to that shown in FIG. 15.

Even further, the optical sensor 500 could be formed of symmetrical and identical opposing ring resonators existing on opposite sides of the cavity 518. The two waveguides would act as a single mode waveguide with a variable internal gap. FIG. 16 shows the cross-section of an embodiment in which a second ring resonator 520 is disposed above the cavity 518 and over the ring resonator 506.

Alternative to the two module structure shown in FIG. 14, the optical sensor 500 can be formed in a single substrate structure, i.e., without modules. Here, multiple step processing may be employed in which a first portion of a substrate layer is grown and then implanted or etched processed to form the integral ring resonator and necessary waveguides and then a subsequent growth stage would be performed to form the cavity on the top surface of the sensor.

Figure 17:
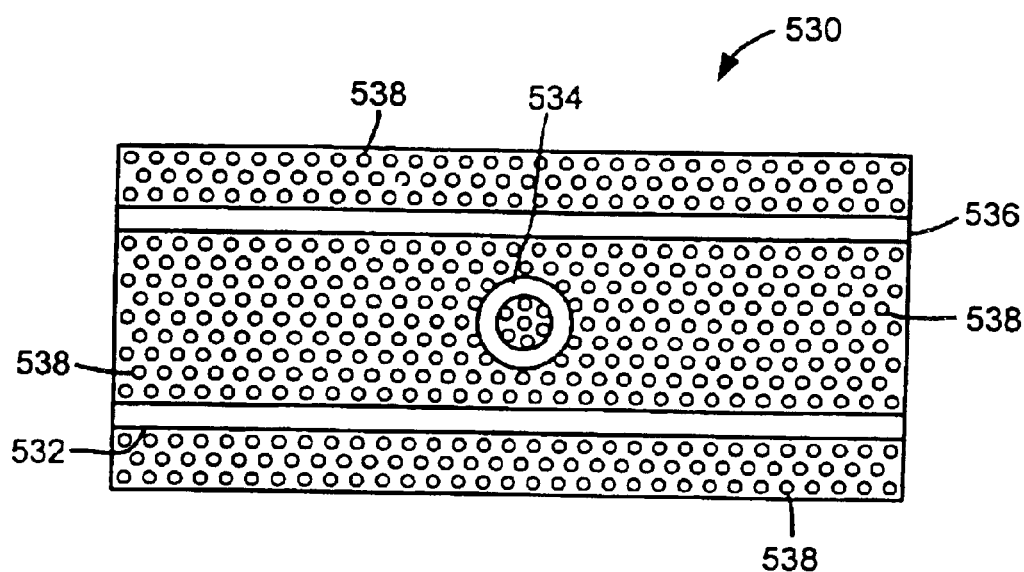
FIG. 17 is a top view of an alternative to the first module of FIG. 14 using a photonic crystal array to form a resonator.

The first module 502 is alternatively formed of a photonic crystal module 530 in FIG. 17. The module 530 has a primary waveguide 532, a resonator 534, and a secondary waveguide 536. The module 530 may be used with the module 504, as an alternative to module 502, or the module 530 may be formed with a variable gap cavity in a unitary structure. The resonator 534 is formed by a change in the spacing in the photonic crystal array as is known in the art.

The waveguides 532, 536 and the resonator 534 are formed in a 2D photonic crystal lattice array. A photonic crystal generally consists of a repetitive array of elements where the dimensions for each element are similar to or on the order of the wavelengths of light to propagate within the array. Photonic crystals are desirable because they have tight mode confinement and low losses even with sharp corners in the waveguide. They also allow for evanescent coupling. As a result, the module 530 is a low loss optical coupler, and the resonator 534 is a high Q resonator.

The module 530 is formed with a 2D array of holes or posts 538 configured in a triangular lattice orientation. The array may be formed using known photonic crystal formation techniques. For example, collimated optical beams may bore holes through an optical substrate material. Lithographic processes by which electron beams directly write the patterns to be etched in thin membrane or heterostructures are also known. The formed 2D photonic crystal array defines the resonator 534 as well as the waveguides 532, 536 and therefore a single processing step may be used to form these three structures simultaneously.

In the module 530, a laser signal propagating within the primary waveguide 532 will evanescent couple into the resonator 534, a ring resonator. As with the other resonators described herein, the resonator 534 may be formed of lasing material or non-lasing material. The signal from the resonator 534 is coupled to the waveguide 536. The module 530 is preferably used with the external cavity 518, where changes to the sensing surface 519 will alter the variable gap of the cavity 518 and the frequency of the resonator signal from the resonator 534.

Though the embodiments shown in FIGS. 14–17 show a primary, or input, waveguide and a secondary, or output, waveguide, it will be understand that a single waveguide may be used as in FIG. 7.

Figure 18:
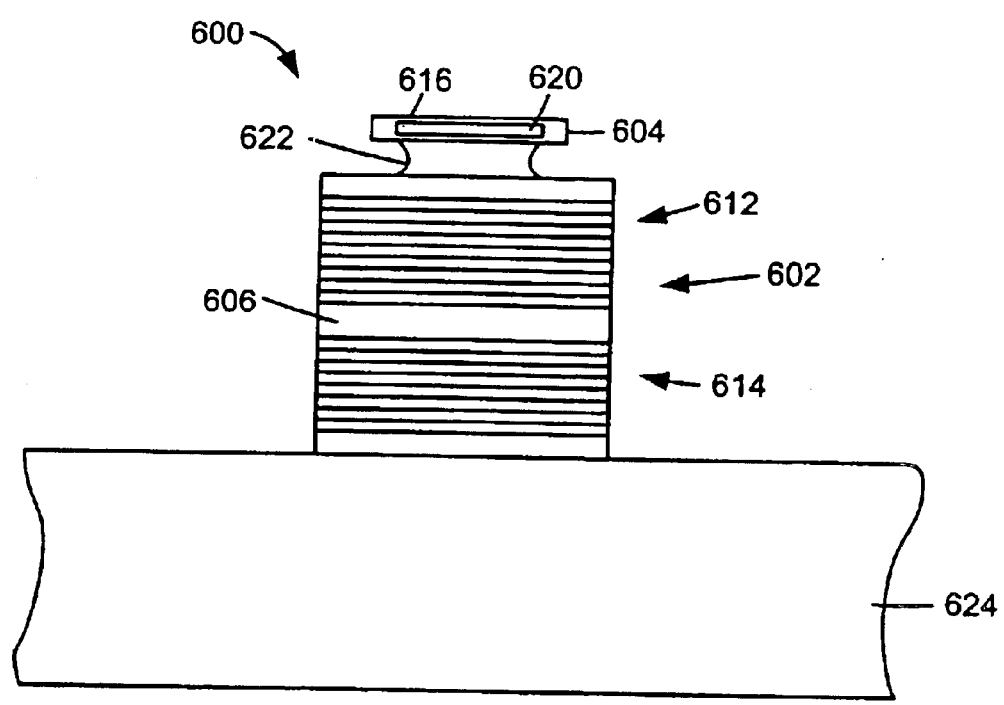
FIG. 18 is a cross-sectional view of a microdisc resonator and VCSEL in accordance with an embodiment.

FIG. 18 shows another embodiment of an optical sensor 600. The optical sensor 600 is formed of a vertical cavity surface emitting laser (VCSEL) 602 having an output coupled to an external resonator 604. The VCSEL 602 exemplarily includes an active region 606 and two reflectors 612 and 614, each being distributed Bragg reflector layers in the preferred embodiment. The resonator 604 is a microdisc resonator operating on the principle of total internal reflection and thus has low losses and a high Q. The resonator 604 has a cavity 620 defining a variable gap that varies in response to changes in a measurable parameter at a sensing surface 616. The resonator 604 is mounted to the top surface of the VCSEL 602 for receiving the output from the VCSEL 602. By way of example, a transparent dielectric 622 is shown for this purpose. The entire sensor 600 could be mounted on a substrate or support layer 624 for easy packaging and placement in existing applications.

In this embodiment, the output from the resonator 604 depends upon the resonant frequency thereof. The resonant frequency is a function of the variable gap of the cavity 620 and that variable gap is a function of the measurable parameters like pressure and temperature. The VCSEL output is coupled to the high Q microdisc 604 to determine the frequency of the VCSEL 602.

As can be seen from the foregoing, a high Q optical resonator with a resonant frequency that is dependent upon a measurable parameter such as pressure, temperature, flow rate, force, material composition, or strain is shown. The resonant frequency of the resonator determines the output frequency of a laser, by having the laser lock onto the resonant frequency, or the resonant frequency may determine the output of a resonator acting as a filter. The output of either is dependent upon the measurable parameter at a sensing surface and can be used to calculate an absolute or differential value for the measurable parameter. The resonator may be formed of an optical medium external to a laser or light source or the optical medium may be internal to the source making the laser cavity the resonator. Numerous waveguides are described above including dielectric resonators like the microdisc and microsphere that rely only upon total internal reflection, as well as resonators that do have waveguides for confining propagating signals. In addition to those shown, other resonator structures will be apparent.

Numerous applications for these teachings have been described above and yet others will be apparent. The high accuracy of the described optical devices is well suited for industrial process and flow system applications, particularly those with low signal strengths where conventional electronic based semiconductor sensors often do not work. In one application, an optical remote pressure sensor could be used where the optical resonator replaces an oil filled capillary tubing. Another application includes ΔP flow meters where pressure is measured in physically separated locations, and a meter is used to determine the change in pressure. In contrast, conventional ΔP sensors require an oil filled isolator system to couple the two physically separated pressures to a common sensor. The optical sensors are also suitable for pressure measurement in high temperature applications where conventional sensors and electronics do not operate, for example, measuring pressure in jet engines, measuring pressure in oil wells and measuring steam. The structures shown could also be used in ΔP transmitters where the ΔP must be measured at high line pressure (AP). Here dual AP optical sensors with high sensitivity could be used. Even further, temperature measurement applications where conventional wiring is not suitable due to electrical interference or safety considerations can now be achieved through the use of all optical sensors. Other sensor applications include using optical sensors to measure flow rate and material composition.

Many additional changes and modifications could be made to the disclosed embodiments without departing from the fair scope and spirit thereof. The scope of some changes is discussed above. The scope of others will be come apparent from the appended claims.

What I claim is:

1. For use with a mode-locked laser source propagating pulsed laser energy characterized by a repetition rate, an optical sensor apparatus for measuring a measurable parameter, the optical sensor apparatus comprising:

an optical resonator disposed to receive at least a portion of the pulsed laser energy, the optical resonator having a waveguide comprising a core having a first dielectric, a cavity defining a variable gap comprising a second dielectric different than the first dielectric, and a sensing surface positioned to vary the variable gap in response to changes in the measurable parameter at the sensing surface such that the repetition rate of the pulsed laser energy changes in response to changes in the measurable parameter, wherein the sensing surface is an outer surface of the waveguide and wherein the cavity is at least partially disposed within the core.

2. The optical sensor apparatus of claim 1, wherein the waveguide further comprises a core and a cladding surrounding the core such that the at least a portion of the laser energy propagates within the core under total internal reflection.

3. The optical sensor of claim 1, wherein the optical resonator further comprises a first reflector at an entrance end of the optical resonator and a second reflector at an exit end of the optical resonator.

4. The optical sensor of claim 1, wherein the waveguide is a ring resonator.

5. The optical sensor of claim 4, wherein the ring resonator is formed of an optical fiber.

6. The optical sensor of claim 4, wherein the ring resonator is formed in an optical substrate.

7. The optical sensor of claim 4, wherein the ring resonator is formed of a photonic crystal structure.

8. The optical sensor of claim 1, wherein the measurable parameter is selected from the group consisting of pressure, temperature, flow rate, material composition, force, and strain.

9. The optical sensor of claim 1, wherein the waveguide is a microdisc.

10. The optical sensor of claim 9, wherein the laser source is a distributed feedback laser in the form of a vertical cavity surface emitting laser.

11. The optical sensor of claim 1, wherein the waveguide is a microsphere having a first hemisphere and a second hemisphere spaced apart by the variable gap, the sensing surface being the outer shell of the microsphere.

12. The optical sensor of claim 1, further comprising a measuring apparatus for measuring the repetition rate of the laser energy.

13. The optical sensor of claim 1, wherein the optical resonator is external to the mode-locked laser source.

14. The optical sensor of claim 1, wherein the optical resonator is internal to the mode-locked laser source, forming a laser cavity of the mode-locked laser source.

15. For use with a mode-locked laser source propagating pulsed laser energy characterized by a repetition rate, an optical sensor apparatus for measuring a measurable parameter, the optical sensor apparatus comprising:

an optical resonator disposed to receive at least a portion of the pulsed laser energy, the optical resonator having a waveguide comprising a first dielectric, a cavity defining a variable gap comprising a second dielectric different than the first dielectric, and a sensing surface positioned to vary the variable gap in response to changes in the measurable parameter at the sensing surface such that the repetition rate of the pulsed laser energy changes in response to changes in the measurable parameter, wherein the waveguide is a microsphere disposed within a receiving cavity formed in a dielectric module, the dielectric module having a membrane that flexes in response to changes in the measurable parameter at the sensing surface to change the repetition rate of the laser energy.

16. For use with a laser source, an optical sensor apparatus for use in measuring a measurable parameter, the optical sensor apparatus comprising:

an optical resonator having a waveguide comprising a core having a first dielectric, a cavity defining a variable gap comprising a second dielectric different than the first dielectric, and a sensing surface positioned to vary the variable gap in response to changes in the measurable parameter at the sensing surface, the optical resonator defining a resonant frequency that varies in response to variations in the variable gap, the optical resonator being disposed such that a laser signal from the optical sensor apparatus has a frequency at the resonant frequency, wherein the sensing surface is an outer surface of the waveguide and wherein the cavity is at least partially disposed within the core.

17. The optical sensor apparatus of claim 16, wherein the optical resonator is internal to the laser source and forms a laser cavity of the laser source.

18. The optical sensor apparatus of claim 16, wherein the optical resonator forms a resonator that is external to the laser source.

19. The optical sensor apparatus of claim 16, wherein the measurable parameter is a physical parameter that applies a force to the sensing surface for varying the variable gap.

20. The optical sensor apparatus of claim 19, wherein the physical parameter is selected from the group consisting of pressure, temperature, flow rate, material composition, force, and strain.

21. The optical sensor apparatus of claim 16, wherein the laser signal propagates within the core under total internal reflection.

22. The optical sensor apparatus of claim 16, wherein the waveguide further comprises a first reflector at an entrance end of the optical resonator and a second reflector at an exit end of the optical resonator.

23. The optical sensor apparatus of claim 16, wherein the waveguide comprises a ring resonator.

24. The optical sensor apparatus of claim 16, wherein the laser source is a distributed feedback laser and the waveguide is a microdisc.

25. The optical sensor apparatus of claim 16, wherein the waveguide is a microsphere having a first hemisphere and a second hemisphere spaced apart by a variable gap that changes in response to changes in the measurable parameter at the sensing surface of the optical resonator, the sensing surface being the outer shell of the microsphere.

26. The optical sensor apparatus of claim 16, further comprising a measuring apparatus for measuring the frequency of the laser signal.

27. The optical sensor apparatus of claim 16, wherein the optical resonator is formed of a lasing material.

28. The optical sensor apparatus of claim 16, wherein the optical resonator is formed of a non-lasing material.

29. For use with a laser source, an optical sensor apparatus for use in measuring a measurable parameter, the optical sensor apparatus comprising:

an optical resonator having a waveguide comprising a first dielectric, a cavity defining a variable gap comprising a second dielectric different than the first dielectric, and a sensing surface positioned to vary the variable gap in response to changes in the measurable parameter at the sensing surface, the optical resonator defining a resonant frequency that varies in response to variations in the variable gap, the optical resonator being disposed such that a laser signal from the optical sensor apparatus has a frequency at the resonant frequency, wherein the waveguide is a microsphere disposed within a receiving cavity formed in a dielectric module, the dielectric module having a membrane that flexes in response to changes in the measurable parameter at the sensing surface.

30. An apparatus for modulating, based on a measurable parameter, the output of a laser source producing a laser energy, the apparatus comprising:

a coupler coupled to receive the laser energy;

a sensing surface; and an external high Q resonator having a core and a cavity at least partially disposed within the core, the high Q resonator characterized by a resonant frequency that varies in response to changes in the measurable parameter, the high Q resonator coupled to the coupler for modulating the laser energy into an information carrying laser signal having a frequency at the resonant frequency of the high Q resonator, wherein the measurable parameter is a physical parameter creating a change in a force applied to the sensing surface to vary the cavity and the resonant frequency, wherein the sensing surface is an outer surface of the external high Q resonator.

31. The apparatus of claim 30, wherein the coupler is a waveguide coupler.

32. The apparatus of claim 30, wherein the physical parameter is selected from the group consisting of pressure, temperature, flow rate, material composition, force, and strain.

33. The apparatus of claim 30, wherein the laser source has a laser cavity characterized by a first Q value, Q1, and the high Q resonator is characterized by a second Q value, Q2, that is substantially higher than Q1.

34. The apparatus of claim 33, wherein Q2 is at least 100.

35. The apparatus of claim 30, wherein the coupler and high Q resonator are within a single substrate.

36. The apparatus of claim 30, wherein the sensing surface is an outer surface of the high Q resonator.

37. The apparatus of claim 30, wherein the sensing surface is spaced apart from the high Q resonator by a cavity.

38. A variable frequency resonator comprising an optical resonator having a sensing surface, a waveguide with a core and a cavity defining a variable gap and extending at least partially into the core, the optical resonator characterized by a resonant frequency that is dependent upon the variable gap which is disposed to after the resonant frequency of the optical resonator in response to changes in a measurable parameter at the sensing surface.

39. The variable frequency resonator of claim 38, wherein the optical resonator further comprises a first reflector disposed at an entrance face of the waveguide and a second reflector disposed at an exit face of the waveguide, the first reflector and second reflector defining a resonant length through the waveguide.

40. The variable frequency resonator of claim 38, wherein the waveguide is an optical fiber.

41. The variable frequency resonator of claim 38, wherein the waveguide is a ring resonator.

42. The variable frequency resonator of claim 38, wherein the waveguide is formed in a photonic crystal.

43. A method of sensing a measurable parameter, the method comprising:

providing a laser signal;

providing a resonator characterized by a resonant frequency and having waveguide comprising a core having a first dielectric and a cavity extending at least partially into the core and defining a variable gap comprising a second dielectric different than the first dielectric and that varies in response to changes in the measurable parameter, where variations to the variable gap alter the resonant frequency;

propagating at least a portion of the laser signal through the resonator such that the laser signal has a frequency at the resonant frequency; and sensing changes in the measurable parameter based on the frequency of the propagated laser signal portion.

44. The method of claim 43, wherein providing the resonator further comprises:

placing a first reflector at an entrance side of the first dielectric; and placing a second reflector at an exit side of the first dielectric, where the first reflector is partially transmissive at the frequency of the laser signal.

45. The method of claim 44, wherein the waveguide is an optical fiber having an inlet end and an outlet end and wherein providing the resonator further comprises:

forming a first Bragg reflector at the inlet end; and forming a second Bragg reflector at the outlet end.

46. The method of claim 43, wherein the laser signal is produced by a laser source and the resonator is external to the laser source, propagating the laser signal further comprising coupling the laser signal from the laser source to the resonator.

47. The method of claim 43, wherein the resonator is formed of a lasing material.

48. The method of claim 43, wherein sensing changes in the measurable parameter comprises the step of providing a sensing surface communicating with the variable gap.

49. A method of sensing a measurable parameter, the method comprising:

providing a pulsed laser signal characterized by a repetition rate;

providing a resonator comprising a waveguide formed of a first dielectric and capable of propagating the pulsed laser signal;

disposing, at least partially within the waveguide, a cavity defining al variable gap formed of a second dielectric different than the first dielectric and that varies in response to changes in the measurable parameter at a surface of the waveguide;

propagating at least a portion of the pulsed laser signal through the resonator such that the repetition rate of the pulsed laser signal changes in response to variations in the variable gap; and sensing changes in the repetition rate in response to variations in the variable gap.

50. The method of claim 49, wherein providing the resonator further comprises:

placing a first reflector at an entrance side of the first dielectric; and placing a second reflector at an exit side of the first dielectric, where the first reflector is partially transmissive at the frequency of the laser signal.

51. The method of claim 50, wherein the waveguide is an optical fiber having an inlet end and an outlet end and providing the resonator further comprises:

forming a first Bragg reflector at the inlet end; and forming a second Bragg reflector at the outlet end.

52. The method of claim 49, wherein sensing variations further comprises providing a sensing surface communicating with the variable gap.

53. The method of claim 49, wherein the pulsed laser signal is produced by a mode-locked laser source and the resonator is external to the mode-locked laser source, propagating the pulsed laser signal further comprising coupling the at least a portion of the pulsed laser signal from the mode-locked laser source to the resonator.

54. The method of claim 49, wherein the resonator is formed of a lasing material forming a mode-locked laser source that produces the pulsed laser signals.

55. For use with a light source, an optical resonator having a waveguide formed of a core having a first dielectric material and a cavity defining a variable gap formed of a second dielectric material different than the first dielectric material, the cavity extending at least partially into the core, wherein the variable gap varies in response to changes in a measurable parameter at a surface of the waveguide, the optical resonator receiving light energy from the light source to alter a characteristic of the light energy in response to variations in the variable gap.

56. The optical resonator of claim 55, wherein the light energy is a continuous wave and the characteristic is frequency.

57. The optical resonator of claim 55, wherein the light energy is a pulsed laser energy and the characteristic is repetition rate.

58. The optical resonator of claim 55, wherein the light source is a LED source.

59. The optical resonator of claim 55, wherein the light source is a laser source.

* * * * *

UNITED STATES PATENT AND TRADEMARK OFFICE
CERTIFICATE OF CORRECTION

PATENT NO. : 6,901,101 B2
DATED : May 31, 2005
INVENTOR(S) : Udo Dinger

It is certified that error appears in the above-identified patent and that said Letters Patent is hereby corrected as shown below:

Column 3,
Line 39, delete "provides" and insert -- provided --.

Column 4,
Line 30, delete "the an" and insert -- an --.
Line 51, delete "dependant" and insert -- dependent --.

Column 5,
Line 42, delete "or a" and insert -- or --.
Line 58, delete "laser (DFB) laser" and insert -- (DFB) laser --.

Column 6,
Line 44, delete "SIN" and insert -- S/N --.
Line 55, delete "$f_y$" and insert -- $f_r$ --.
Line 56, delete "SIN" and insert -- S/N --.

Column 10,
Line 67, delete "could 200 forms" and insert -- 200 could form --.

Column 11,
Line 3, delete "a optical" and insert -- an optical --.

Column 14,
Line 16, delete "provided" and insert -- provide --.
Line 30, delete "FIG. 14" and insert -- FIG. 14A and FIG. 14B --.

Column 16,
Line 23, delete "be come" and insert -- become --.
Line 43, delete "comprises a core and" and insert -- comprises --.

Column 19,
Line 10, delete "after" and insert -- alter --.
Line 29, delete "having waveguide" and insert -- having a waveguide --.

UNITED STATES PATENT AND TRADEMARK OFFICE
CERTIFICATE OF CORRECTION

PATENT NO. : 6,901,101 B2
DATED : May 31, 2005
INVENTOR(S) : Udo Dinger

It is certified that error appears in the above-identified patent and that said Letters Patent is hereby corrected as shown below:

Column 20,
Line 8, delete "al" and insert -- a --.

Signed and Sealed this

Ninth Day of May, 2006

JON W. DUDAS
*Director of the United States Patent and Trademark Office*